United States Patent Office 3,297,687
Patented Jan. 10, 1967

3,297,687
METHOD OF PREPARING 1,2 - DISUBSTITUTED STEROIDS AND PRODUCTS RESULTING THEREFROM
Louis Israel Feldman, Spring Valley, Chester Eric Holmlund, Pearl River, and Karl Jolivette Sax, West Nyack, N.Y., assignors to American Cyanamid Company, Stamford, Conn., a corporation of Maine
No Drawing. Filed Nov. 23, 1964, Ser. No. 413,324
10 Claims. (Cl. 260—239.55)

This invention relates to new biologically active steroids. More particularly it relates to new 1,2-disubstituted steroids and methods of preparing the same.

The use of various steroids as important therapeutic agents has been known and widely accepted for some time. All biologically active anti-inflammatory steroids currently in therapeutic use, however, cause incidental, undesirable catabolic or mineralocorticoid action. Anti-inflammatory steroids of this invention are free of these undesired side effects. The steroid 2,11β,21-trihydroxy-16α,17α-isopropylindenedioxypregna - 1,4 - diene-3,20-dione, for example, while active therapeutically as an anti-inflammatory agent causes neither catabolic nor mineral ocorticoid activity of any significance. In addition to their intrinsic biological utility the steroids of this invention are useful as intermediates for the preparation of other biologically active steroids. The 1α,2α-dihydroxy steroids, for example, may be converted into acetoxy or 1α,2α-isopropylidenedioxy derivative compounds by well-known chemical transformations, and both the starting 1α,2α-dihydroxy steroids and their isopropylidenedioxy derivatives may be further converted by conventional methods into the corresponding 2-hydroxy-1,4-dien-3-ones.

The novel steroids of this invention may be illustrated by the following formula:

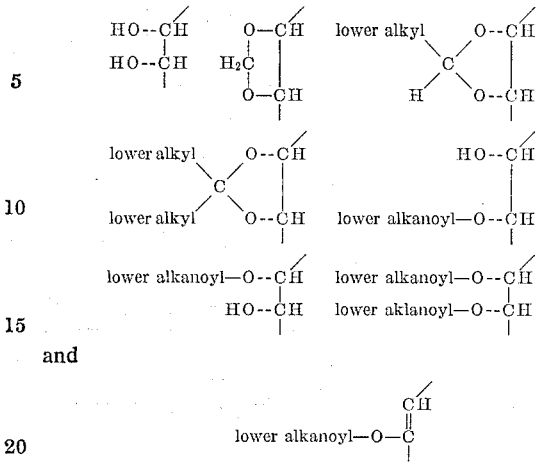

wherein A is selected from the group consisting of

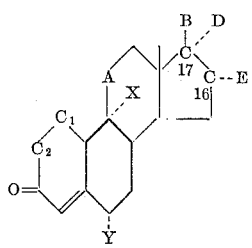

B is selected from the group consisting of hydroxy, lower alkanoyloxy acetyl and hydroxy acetyl; D is selected from the group consisting of hydrogen, lower alkyl, lower alkenyl, lower alkynyl and lower alkanoyloxy and B and D taken together represent =O; E is hydrogen and D and E taken together represent a lower alkylidenedioxy group; X and Y are selected from the group consisting of hydrogen and halogen and

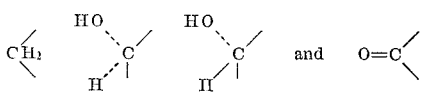

is selected from the group consisting of

HO—CH    O—CH    lower alkyl    O—CH
HO—CH    H₂C                      C
         O—CH                  H  O—CH lower alkyl    O—CH              HO—CH
               C
lower alkyl    O—CH    lower alkanoyl—O—CH lower alkanoyl—O—CH    lower alkanoyl—O—CH
      HO—CH            lower aklanoyl—O—CH and CH
        ‖
lower alkanoyl—O—C The preparation of the 1α,2α-diols of this invention is carried out by a novel microbiological conversion of certain suitable steroids, elaborated below utilizing one of a number of different microorganisms. Various microorganisms, which under ordinary conditions may be used to dehydrogenate steroids at the C-1 and C-2 positions with the resultant formation of a double bond, are capable under conditions disclosed in this invention of further converting the Δ' steroids into 1α,2α-dihydroxy-steroid derivatives.

Illustrative of the various microorganisms capable of use in the process of this invention are those of the orders Eubacteriales and Actinomycetales including genera such as Bacillus, Corynebacterium, Bacterium, Mycobacterium and Norcardia. Among the species which may be used are *Nocardia corallina, N. erythropolis, N. aurantia, Mycobacterium phlei, Corynebacterium simplex, Bacillus cyclooxydans, Bacterium mycoides,* and *Bacterium havaniensis.* The microorganisms are available from several culture collection agencies, such as, American Type Culture Collection, Washington. D.C.; Northern Regional Research Laboratories, Peoria, Illinois; and the Imperial Institute of Mycology, Kew, England.

Formation of the diol-forming enzyme system necessary in the hydroxylation process is carried out by an aerobic cultivation of one of the above microorganisms in a suitable nutrient medium acting upon a suitable inducing agent. In general, the process of this invention is dependent upon two related conditions. The first requires the use of a steroid inducer during the cultivation of the microorganism to bring about production of the diol-forming enzyme system. The inducing agent serves to alter the microorganism in such a way as to induce the 1α,2α-diol-producing enzymes. A variety of androstenes and pregnenes may be used as the inducer, of which one example is androst-4-ene-3,17-dione. During the induction of the diol-forming system in this manner, however, an undesired enzyme, a 9α-hydroxylase, is unavoidably and simultaneously induced. When the organism is then permitted to act on a substrate the 9α-hydroxylase competes preferentially with the diol-forming enzyme and ordinarily converts the substrate into 9α-hydroxylated and 9:10 seco-derivatives of the steroid instead of the desired 1α,2α-dihydroxy steroids.

The second condition necessary in the process of this invention, therefore, requires the use of a selected substrate. It has been found that only steroids whose chemical configuration prevent 9α-hydroxylation from taking place form the desired 1α,2α-diols as end products. The two conditions are dependent on one another in the process in that without the use of the inducer the microbiological conversion ordinarily forms the 1-dehydro steroid derivatives, and if a non-suitable substrate is used, 9:10 seco-derivatives of the steroids are ordinarily obtained.

Steroids whose structures suppress 9α-hydroxylation and which therefore may be used as starting substrates to produce the 1α,2α-dihydroxylated derivatives include those belonging to the androstane and pregnane series substituted at the C-2 or C-9 or C-17α-position. Such steroids, for example, include 2α-hydroxyandrost-4-ene-3,17-dione; 17α-ethynyl-17β-hydroxyandrost-4-en-3-one; 17α-acetoxyprogesterone; 6α-fluoro-17α-acetoxyprogesterone; 9α-fluoro-11β-hydroxyprogesterone; 9α - fluoro-11β,21-dihydroxyprogesterone; 16α,17α - isopropylidenedioxy-11β,21-dihydroxy-pregn-4-ene-3,20-dione, and the like.

In general, the conditions for growing the microorganisms for use in this invention are the same as those for growing any aerobic microorganism, and are well known to those skilled in the art. The organisms are grown in a nutrient medium which is aerated either by agitating the medium in the presence of air or by passing a current of air through the medium.

A suitable nutrient medium contains a soluble source of carbon, nitrogen and mineral elements. Sources of carbon include sugars, usch as glucose, sucrose, maltose, dextrose, xylose and galactose, also, alcohols, such as, glycerol or mannitol, corn starch, organic acids, such as, citric acid, malic acid and acetic acid, and various natural products containing carbohydrates such as corn steep liquor, soybean meal, cotton seed meal and many other available materials which have been used heretofore as the source of carbon in fermentation processes. Usually a variety of the above can be employed in the medium with good results.

Sources of nitrogen include some of the above named materials, such as, corn steep liquor, soybean meal, cotton seed meal and the like and various other substances such as beef extract, casein, yeast enzymatically digested proteins, and degradation products, including peptones, amino acids and many other available proteinaceous materials which have been found to be suitable in supporting the growth of fungi. Inorganic sources of nitrogen, including urea, ammonium salts, nitrates and the like may be used in the medium as a source of assimilable nitrogen to provide a favorable growth medium for the organism.

The mineral requirements of fermentation are usually supplied in the crude materials which are often used as sources of carbon and nitrogen or occur in water that is used in the process. Cations and anions which may be desirable in added amounts include sodium, potassium, calcium, magnesium, phosphate, sulphate, chloride, cobalt, manganese and various others. The use of trace elements, such as boron, copper, cobalt, molybdenum and chromium is often desirable. The microorganisms employed in the conversion are grown in the following manner unless otherwise noted.

PREPARATION OF INOCULUM

An agar slant containing a visible growth of the organism is washed with 5 milliliters of a 0.9% sterile aqueous solution of sodium chloride, and the growth is suspended by agitation or by mechanical means. One milliliter of this suspension is transferred into a 500 milliliter flask containing about 100 milliliters of the following medium which has been sterilized in the flask.

| | Grams |
|---|---|
| Beef extract | 4.0 |
| Peptone | 4.0 |
| Glucose | 10.0 |
| Sodium chloride | 2.5 |
| Yeast extract | 1.0 |
| Water to 1,000 ml. | |

The flask is then placed on a reciprocating shaker and kept at 37° C. for 7 hours.

PREINDUCTION GROWTH AND INDUCTION

Fermentation vessels containing about 10% of their volume of the above medium are inoculated with about 0.5% of their volume of the inoculum prepared as described above, and the organism is allowed to grow during shaking on a reciprocating shaker at a temperature of 25–30° C. for 16 hours. At the end of this period sufficient inducer steroid (usually androst-4-ene-3,17-dione), dissolved in a minimal quantity of methanol, is added to produce a final concentration of 20 μg. of steroid per milliliter of medium. Incubation is continued for 2–5 hours to prodce the induced cell suspension.

FERMENTATION

The steroid substrate, dissolved in a minimal quantity of methanol is added to the induced cell suspension in sufficient quantity to produce a concentration of 200 μg. of steroid per milliliter of cell suspension. Incubation is continued and samples for testing purposes are taken periodically in order to follow the progress of the conversion. The fermentation is terminated by addition of a water immiscible solvent such as ethyl acetate or chloroform, when an assay of a sample indicates that a sufficient quantity of the desired product is present. The isolation, purification and conversion of the 1,2-diol to other derivatives is described hereinafter in the examples.

The following examples describe in detail the fermentation of substrates to produce the 1,2-dihydroxy steroids of this invention.

Example 1.—Preparation of 1α,2α,11β,21-tetrahydroxy-16α,17α-isopropylidenedioxypregn-4-ene-3,20-dione To 10 milliliters of a suspension of induced cells of Nocardia corallina (ATCC No. 999), prepared as described above, 0.1 milliliter of a solution of 20 milligrams of 11β,21-dihydroxy-16α,17α-isopropylidenedioxypregn-4-ene-3,20-dione in 1.0 milliliter of methanol is added. Incubation is continued, and samples are taken periodically in order to follow the progress of the conversion. The samples are extracted with ethyl acetate, and the ethyl acetate extracts are concentrated to a residue. The residue is assayed by paper chromatography using a system consisting of acetic acid, methanol, p-dioxane, and water in the volume ratios of 4:1:1:2, respectively. It is found that within 7 hours all or almost all of the added steroid substrate is converted to its 1-dehydro derivative ($R_f$ 0.74) and a small amount of the 1-dehydro derivative is further converted to 1α,2α,11β,21-tetrahydroxy-16α-17α-isopropylidenedioxypregn-4 - ene - 3,20-dione ($R_f$ 0.40). On incubation for a period of 24 to 48 hours the latter compound is found to be the principal product.

Example 2.—Preparation of 1α,2α,11β,21-tetrahydroxy-16α,17α-isopropylidenedioxypregn-4-ene-3,20-dione To 30 liters of a medium, consitsing of 0.4% beef extract, 0.4% peptone, 1.0% glucose, 0.25% sodium chloride, and 0.1% yeast extract, in a 10 gallon fermentor is added 1 liter of an 18 hours old growth of N. corallina, (ATCC No. 999). The mixture is incubated at 28° C. with agitation and passage of sterile air (0.7 liter per minute) through the medium. After 23 hours, 600 mg. of androst-4-ene-3,17-dione is dissolved in 30 milliliters of methanol, and the solution is added to the fermentor. After 4 hours of incubation a solution of 6.0 grams of 11β,21-dihydroxy-16α,17α - isopropylidenedioxypregn - 4-ene-3,20-dione in 100 milliliters of methanol is added. Incubation is continued for an additional 167 hours, and the fermentation is terminated by mixing the fermentor contents with 15 liters of ethyl acetate. The ethyl acetate layer is separated and the aqueous portion is extracted with two additional 15 liter quantities of ethyl acetate.

The combined ethyl acetate extract is concentrated to an oily residue, which is fractionated by partition chromatography on a column composed of 1200 grams of diatomaceous earth moistened with the lower phase of a solvent system consisting of water, dioxane, and cyclohexane in the volume ratios of 1:5:8, respectively. The column is developed with the upper phase of this solvent system, and the fraction of eluate between about 10 liters to 16.5 liters is collected and concentrated to a residue under reduced pressure. The residue is crystallized from a mixture of acetone and hexane, and the crude product is recrystallized twice from the same solvent mixture to yield 600 mg. of 1α,2α,11β,21-tetrahydroxy-16α,17α-isopropylidenedioxypregn-4-ene - 3,20 - dione, melting point 242.5°–244° C.; $[\alpha]_D^{25}+146°$ (methanol); ultraviolet spectrum:

$$\lambda_{max.}^{MeOH} \ 238 \ m\mu \ \epsilon \ 12,600$$

An additional 262 mg. of product is obtained by processing the 8–10 liter fraction from the chromatography column together with the mother liquors from the crystallizations in the above manner. This material has a melting point at 249°–251.5° C. with decomposition.

*Example 3.—Preparation of 17α-ethynyl-1α,2α,17β-trihydroxyandrost-4-en-3-one*

A fermentation of 20 mg. of 17α-ethynyl-17β-hydroxyandrost-4-en-3-one is conducted in the same manner as described in Example 1 with induced *Nocardia corallina*. After incubation for about 20 hours a substantial portion of the starting material ($R_f$ 0.63) is converted into 17α-ethynyl-1α,2α,17β-trihydroxyandrost-4 - en - 3 - one ($R_f$ 0.21), which may be further characterized by its positive blue tetrazolium reaction, indicative of the 2-hydroxy-3-ketone structure.

*Example 4.—Preparation of 17α-ethynyl-1α,2α,17β-trihydroxyandrost-4-en-3-one*

A fermentation is conducted as described in Example 2. After suitable induction and incubation as in Example 2, a solution of 6.0 grams of 17α-ethynyl-17β-hydroxyandrost-4-en-3-one in 600 ml. of p-dioxane is added to the fermentor, and incubation is continued until an analysis of a sample shows that most of the starting material is converted into 17α-ethynyl-1α,2α,17β - trihydroxyandrost-4-en-3-one. The fermentation mixture is agitated gently with an equal volume of ethyl acetate. The ethyl acetate layer is separated and the aqueous portion extracted with two additional quantities of ethyl acetate. The ethyl acetate extracts are combined and concentrated under reduced pressure to an oily residue. The residue is dissolved in methylene chloride and the solution is fractionated by adsorption chromatography in a glass column 40 mm. in diameter containing 400 grams of silica gel. An additional 600 milliliters of methylene chloride is added to the column. The column is developed by a process known as gradient elution. Four liters of methylene chloride is added to the reservoir initially, and thereafter a solution consisting of 49% ether, 49% methylene chloride, and 2% methanol (all percent by volume) is added during stirring to the reservoir at the same rate that solvent is taken from the reservoir and added to the column. When about 4 liters of solvent has emerged from the bottom of the column the eluate containing the desired 17α-ethynyl-1α,2α,17β-trihydroxyandrost-4-en - 3 - one begins to appear, and about 3 liters of this eluate is then collected. At this point substantially all of the 1,2-diol is removed from the column and the elution is terminated. The eluate is evaporated to a residue. Concentration of an ethyl acetate solution of the residue with hexane until crystallization begins, and then cooling of the mixture in an ice bath gives crystalline 17α-ethynyl-1α,2α,17β-trihydroxyandrost-4-en-3-one which after recrystallization melts at 221°–223.5° C.

$[\alpha]_D^{25°} +6.6°$ (dioxane solution); ultraviolet spectrum:

$$\lambda_{max.}^{MeOH} \ 239 \ m\mu, \ \epsilon 14,800$$

*Example 5.—Preparation of selected 1α,2α-dihydroxylated steroids*

Fermentations are conducted as described in Example 1 with other substrates, such as, for example (A) 2α-hydroxyandrost-4-ene-3,17-dione; (B) 9α-fluoro-11β,17β-dihydroxy-17α-methylandrost-4-en-3-one; (C) 17α-acetoxyprogesterone; (D) 6α-fluoro-17α-acetoxyprogesterone; (E) 9α-fluoro-11β-hydroxyprogesterone and (F) 9α-fluoro-11β,21-dihydroxyprogesterone.

1α,2α-dihydroxy steroids are obtained as follows: (A) 1α,2α-dihydroxyandrost-4-ene-3,17-dione; (B) 1α,2α,17β-trihydroxy - 9α - fluoro - 17α - methylandrost - 4 - ene-3,11-dione; (C) 1α,2α-dihydroxy-17α-acetoxyprogesterone; (D) 1α,2α-dihydroxy-6α-fluoro-17α-acetoxyprogesterone; (E) 1α,2α,11β-trihydroxy-9α-fluoroprogesterone and (F) 1α,2α-11β,21-tetrahydroxy-9α-fluoroprogesterone.

*Example 6.—Preparation of 17α-ethynyl-1α,2α,17β-trihydroxyandrost-4-en-3-one*

Fermentations are conducted as described in Example 3 with the exception that the induced cells of *Nocardia erythropolis, Nocardia aurantia, Mycobacterium phlei, Corynebacterium simplex, Bacillus cyclooxydans, Bacterium mycoides,* and *Bacterium havaniensis* are used individually in place of *Nocardia corallina*. All fermentations produced 17α-ethynyl-1α,2α,17β-trihydroxy-androst-4-en-3-one in good yield.

*Example 7.—Preparation of 11β,21-dihydroxy-1α, 2α; 16α,17α-diisopropylidenedioxypregn-4-ene-3,20-dione*

A solution of 500 mg. of 1α,2α,11β,21-tetrahydroxy-16α,17α-isoproplidenedioxypregn-4-ene-3,20-dione in 20 ml. of acetone is reacted with 0.15 ml. of 70% perchloric acid at room temperature for 2.5 hours. The reaction mixture is treated with 2.5 ml. of an aqueous saturated solution of sodium bicarbonate, and placed under reduced pressure until almost all of the acetone is evaporated. The steroid is extracted with methylene chloride and the combined extracts are evaporated to a residue. The residue is then fractionated by partition chromatography to yield some unchanged starting material and product fractions. Evaporation of the solvent from the latter fraction gives a residue which on crystallization from an acetone-hexane system yields 260 mg. of 11β,21-dihydroxy-1α,2α; 16α,17α - diisopropylidenedioxypregn - 4-ene-3,20-dione. Recrystallization of a portion of this material from a mixture of acetone and hexane yields a product, melting point 254.5°–256° C.; $[\alpha]_D^{25°} +134°$ (methanol); ultraviolet spectrum:

$$\lambda_{max.}^{MeOH} \ 245 \ m\mu, \ \epsilon 15,650$$

*Example 8.—Preparation of 21-acetoxy-2,11β-dihydroxy-16α,17α-isopropylidenedioxypregna-1,4-diene-3,20-dione*

A solution of 80 mg. of 1α,2α,11β,21-tetrahydroxy-16α,17α-isopropylidenedioxypregn-4-ene-3,20-dione in 50 ml. of glacial acetic acid is refluxed for 24 hours. The reaction mixture is concentrated under reduced pressure to a residue, which is fractionated by partition chromatography on a column composed of 50 grams of diatomaceous earth moistened with the lower phase of a solvent system consisting of water, methanol, dioxane and cyclohexane in the volume ratios of 2:4:1:10, respectively. The column is eluted with the upper phase of this solvent system, and the fraction of eluate between about 200 ml. and 350 ml. is collected and concentrated to a residue. The residue, crystallized from methanol-water and an acetone-hexane system, yields 55 mg. of 21-acetoxy - 2,11β - dihydroxy - 16α,17α - isopropylenedioxypregna-1,4-diene-3,20-dione, melting point 217°–217.5° C.; $[\alpha]_D^{25°}$ +90° (methanol); ultraviolet spectrum:

$$\lambda_{max.}^{MeOH} \ 253 \ m\mu \ \epsilon \ 14,700$$

*Example 9.—Preparation of 2,11β,21 - trihydroxy - 16α, 17α - isopropylidenedioxypregna - 1,4 - diene - 3,20-dione*

A solution of 1 mg. of the steroid obtained as in Example 8 in 0.2 ml. of methanol is treated with 0.2 ml. of a 1% aqueous solution of sodium carbonate. The mixture is heated on a steam bath for 0.5 hour, then diluted with water, and the steroid is extracted with methylene chloride. Analysis of the extract by paper chromatography indicates that the product possesses considerably less mobility than the starting material, and is determined to have the structure: 2,11β,21-trihydroxy-16α,17α - isopropylidenedioxypregna - 1,4 - diene - 3,20-dione.

*Example 10.—Preparation of 17α-ethynyl-2,17β-dihydroxyandrosta-1,4-dien-3-one*

A solution of 250 mg. of 17α-ethynyl-1α,2α,17β-trihydroxyandrost-4-en-3-one in 15 ml. of methanol is treated with 5 ml. of a 10% aqueous solution of potassium hydroxide. The mixture is kept at room temperature overnight. The reaction mixture is then neutralized with dilute hydrochloric acid, diluted with water, and the steroid is extracted with methylene chloride. The extracts are evaporated to an oily residue, which is fractionated by partition chromatography on a column composed of 75 grams of diatomaceous earth, which is wet with 37.5 ml. of the lower phase of a solvent system consisting of water, methanol, dioxane and cyclohexane in the volume ratios of 1:2:1:5, respectively. The elution of the column is effected with upper phase of this solvent system until 80 ml. of eluate is collected. The elution is continued with the upper phase of a system composed of the same solvents in the volume ratios of 1:1:1:5, respectively, until 342 ml. of eluate is collected. The elution is further continued with the upper phase of a solvent system of the same solvents in the volume ratios of 1:1:2:5, respectively, which provides a single steroid fraction at 5.8 column retention volumes. Evaporation of the solvent from this fraction, and crystallization of the residue from ether-hexane, yields 172 mg. of 17α-ethynyl-2,17β-dihydroxyandrosta-1,4-diene-3-one, melting point about 95° C. with softening to an oil; $[\alpha]_D^{25°}$ +56° (methanol); ultraviolet spectrum:

$$\lambda_{max.}^{MeOH} \ 255 \ m\mu, \ \epsilon \ 13,350.$$

*Example 11.—Preparation of 17α-ethynyl-17β-hydroxy-1α,2α-isopropylidenedioxyandrost-4-en-3-one*

A suspension of 250 mg. of 17α-ethynyl-1α,2α,17β-trihydroxyandrost-4-en-3-one in 10 ml. of acetone is treated with 0.1 ml. of perchloric acid. The reaction mixture is kept at room temperature for two hours. The mixture is then treated with an excess of sodium bicarbonate solution, and the acetone is evaporated under reduced pressure. The residue is extracted with methylene chloride, and the extract is evaporated to a residue. Crystallization of the residue thus obtained yields 175 mg. of 17α-ethynyl-17β-hydroxy-1α,2α - isopropylidenedioxyandrost-4-en-3-one, melting point 212°–213° C.; $[\alpha]_D^{25°}$ –24° (dioxane); ultraviolet spectrum:

$$\lambda_{max.}^{MeOH} \ 244 \ m\mu, \ \epsilon \ 13,800$$

*Example 12.—Preparation of 2α-acetoxy-17α-ethynyl-1α,17β-dihydroxyandrost-4-en-3-one*

A solution of 75 mg. of 17α-ethynyl-1α,2α,17β-trihydroxyandrost-4-en-3-one in a mixture of 4.5 ml. of pyridine and 0.5 ml. of acetic anhydride is allowed to stand 3 hours at room temperature. The solution is poured into 50 ml. of cold, dilute hydrochloric acid, and the steroid is extracted with ether. The extract is washed with water, with dilute sodium bicarbonate solution and again with water. The ether layer is dried over sodium sulfate, filtered and the ether is evaporated. A crystallization of the residue from a mixture of ethyl acetate and hexane with three further recrystallizations from the same solvents yields 18 mg. of 2α-acetoxy-17α-ethynyl-1α,17β-dihydroxyandrost-4-en-3-one, melting point 225°–228°C.; $[\alpha]_D^{25°}$ –35° 9 (dioxane); ultraviolet spectrum:

$$\lambda_{max.}^{MeOH} \ 240 \ m\mu, \ \epsilon \ 14,700$$

Additional product may be recovered from further treatment of the mother liquors.

*Example 13.—Preparation of selected 1,2-acetoxy steroids*

Acetylation of 100 mg. of 17α-ethynyl-1α,2α17β-trihydroxyandrost-4-en-3-one in a mixture of 5 ml. of acetic anhydride and 5 ml. of pyridine for one hour at room temperature produces, as indicated by paper chromatography analysis, the 2α-monoacetate as the principal product, together with minor amounts of products of further reaction. When the reaction mixture is refluxed for one hour, allowed to stand overnight at room temperature, and the products isolated by chromatographic methods, they are identified at 1α,2α-diacetoxy-17α-ethynyl-17β-hydroxyandrost-4-en-3-one; 2-acetoxy-17α - ethynyl-17β-hydroxyandrost-1,4 - dien-3-one; 2,17β-diacetoxy-17α-ethynylandrosta-1,4-dien-3-one and 1α,2α,17β-triacetoxy-17α-ethynylandrost-4-en-3-one; from physical and chemical properties.

*Example 14.—Preparation of 9α-fluoro-1α,2α,17β-trihydroxy-17α-methylandrost-4-ene-3,11-dione*

An inoculum is prepared by distributing the growth from six agar slants of *N. corallina* among six 500 ml. Erlenmeyer flasks, each containing 100 ml. of a medium consisting of 0.4% beef extract, 0.4% peptone, 1.0% glucose, 0.25% sodium chloride and 0.1% yeast extract, and shaking the flasks on a reciprocating shaker for 7 hours at 37° C. One hundred and four 500 ml. flasks, each containing 100 ml. of the above medium inoculated with 5 ml. of the inoculum thus prepared, and are shaken for 16 hours at 28° C., after which 1 ml. of a methanolic solution containing 10 mg. of 9α-fluoro-11β,17β-dihydroxy-17α-methylandrost-4-en-3-one is added to each flask. The flasks are returned to the reciprocating shaker and are shaken at 28° C. for an additional 28 hours, after which assay results indicated that almost all of the added steroid is converted into products. The pooled fermentation mixture is extracted with an equal volume of chloroform three times, and the combined extract is concentrated under vacuum to an oily residue. The residue is chromatographed on a column containing 300 grams of diatomaceous earth moistened with 150 ml. of the lower phase of a solvent system consisting of water, cyclohexane and dioxane in the volume ratios of 1:6:5, respectively. The column is developed with the upper phase of this system. The fraction of eluate containing the major product is concentrated under reduced pressure to a residue, which is fractionally crystallized from a mixture of acetone and hexane to yield 231 mg. of 9α-fluoro-1α,2α-17β - trihydroxy-17α-methylandrost - 4-ene-3,11-dione, melting point 169.5–170° C.; $[\alpha]_D^{25°}$ +83° (methanol) ultraviolet spectrum:

$$\lambda_{max.}^{MeOH} \ 234 \ m\mu, \ \epsilon \ 13,000$$

A higher melting crystal modification is sometimes obtained (177–179° C.).

*Example 15.—Preparation of 9α-fluoro-17β-hydroxy-1α,2α-isopropylidenedioxy-17α - methylandrost - 4-ene-3,11-dione*

A suspension of 1 mg. of 9α-fluoro-1α,2α,17β-trihydroxy-17α-methylandrost-4-ene-3,11-dione in 0.2 ml. of acetone is treated with 0.2 ml. of a solution prepared by mixing 0.24 ml. of 70% perchloric acid and 5 ml. of acetone. The mixture is kept at room temperature for one hour, neutralized by the addition of sodium bicarbonate solution, diluted with water, and extracted with 0.4 ml. of methylene chloride. The greatly reduced polarity of the steroid found in the methylene chloride extract shows that the starting material is converted into 9α-fluoro-17β-hydroxy-1α,2α - isopropylidenedioxy-17α-methylandrost-4-ene-3,11-dione.

We claim:
1. A compound of the formula:

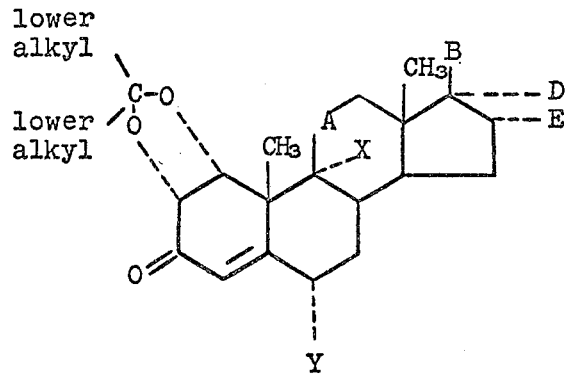

wherein A is selected from the group consisting of

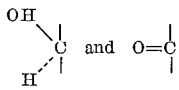

B is selected from the group consisting of hydroxy, acetyl and hydroxyacetyl; D is selected from the group consisting of hydrogen, lower alkyl and lower alkynyl; E is hydrogen and D and E taken together represent a lower alkylidenedioxy group, X and Y are selected from the group consisting of hydrogen and fluorine.

2. The compound 1α,2α,11β,21-tetrahydroxy-16α,17α-isopropylidenedioxypregn-4-ene-3,20-dione.
3. The compound 9α-fluoro - 1α,2α,11β,17β-tetrahydroxy 17α-methylandrost-4-ene-3-one.
4. The compound 17α-acetoxy-6α - fluoro-1α,2α-dihydroxyprogesterone.
5. The compound 9α-fluoro-1α,2α,11β-trihydroxyprogesterone.
6. The compound 9α-fluoro-1α,2α,11β,21-tetrahydroxyprogesterone.
7. The compound 11β,21-dihydroxy-1α,2α; 16α,17α-diisopropylidenedioxypregn-4-ene-3,20-dione.
8. The compound 17α-ethynyl-17β-hydroxy-1α,2α-isopropylidenedioxyandrost-4-en-3-one.
9. The compound 9α-fluoro-1α,2α,17β-trihydroxy-17α-methylandrost-4-ene-3,11-dione.
10. The compound 9α-fluoro-17β - hydroxy-1α,2α-isopropylidenedioxy-17α-methylandrost-4-ene-3,11-dione.

References Cited by the Examiner

UNITED STATES PATENTS

| | | | |
|---|---|---|---|
| 2,948,740 | 8/1960 | Baran | 260—397.4 |
| 2,968,595 | 1/1961 | Greenspan et al. | 195—51 |
| 3,060,230 | 10/1962 | Kubota | 260—488 |
| 3,063,991 | 11/1962 | Feldman et al. | 260—239.55 |
| 3,081,317 | 3/1963 | Clarke | 260—397.4 |
| 3,083,198 | 3/1963 | Chemerda et al. | 260—239.55 |

OTHER REFERENCES

Pappo et al.: Tetrahedron No. 9, pages 365 to 371, 1962 (page 367 relied on).

LEWIS GOTTS, *Primary Examiner.*

HENRY A. FRENCH, *Assistant Examiner.*